(12) United States Patent
Seidel et al.

(10) Patent No.: US 8,580,987 B2
(45) Date of Patent: Nov. 12, 2013

(54) METHOD FOR REPROCESSING BIODIESEL SLUDGE

(75) Inventors: Eckhard Seidel, Frankfurt (DE); Rudolf Bönsch, Nackenheim (DE); Ute Raab-Brill, Bad Vilbel (DE)

(73) Assignee: Lurgi GmbH, Frankfurt am Main (DE)

( * ) Notice: Subject to any disclaimer, the term of this patent is extended or adjusted under 35 U.S.C. 154(b) by 0 days.

(21) Appl. No.: 13/582,617

(22) PCT Filed: Nov. 6, 2010

(86) PCT No.: PCT/DE2010/001302
§ 371 (c)(1),
(2), (4) Date: Sep. 28, 2012

(87) PCT Pub. No.: WO2011/113401
PCT Pub. Date: Sep. 22, 2011

(65) Prior Publication Data
US 2013/0012732 A1    Jan. 10, 2013

(30) Foreign Application Priority Data
Mar. 16, 2010    (DE) .......................... 10 2010 011 606

(51) Int. Cl.
*C11B 3/00* (2006.01)

(52) U.S. Cl.
USPC ........................................................ 554/177

(58) Field of Classification Search
USPC ........................................................ 554/177
See application file for complete search history.

(56) References Cited

U.S. PATENT DOCUMENTS

| 8,193,383 B2 | 6/2012 | Saft et al. |
| 2006/0121174 A1 | 6/2006 | Franke |
| 2010/0105935 A1 | 4/2010 | Saft et al. |

FOREIGN PATENT DOCUMENTS

| DE | 10 2006 044 467 B4 | 7/2008 |
| EP | 2 071 014 A1 | 6/2009 |
| EP | 2071014 A1 * | 6/2009 |
| WO | 2009/106360 A2 | 9/2009 |
| WO | 2009/132670 A1 | 11/2009 |
| WO | WO 2009132670 A1 * | 11/2009 |
| WO | 2010/107446 A1 | 9/2010 |

OTHER PUBLICATIONS

Dunn et al : "Effects of minor constituents on cold flow propert i es and Performance of biodiesel ", Progress in Energy and Combustion Science, vol. 35, No. 6, 2009, pp. 481-489.*
Ullmann's Encyclopedia of Industrial Chemistry, Sixth Edition, 5.2. Synthesis, (1998).
Ullmann's Encyclopedia of Industrial Chemistry, Sixth Edition, Fig. 3, (1998).
Brochure, MK-121—High activity methanol synthesis catalyst (Haldor Topsoe A/S): Nov. 2000-2002.
Haldor Topsoe and Johnson Matthey, "Catalyst Suppliers meet new Challanges", Nitrogen + Syngas 296, pp. 38-47 (2008).
Monzón et al., "Sintering and Redispersion of Pt/γ-Al2O3 Catalysis: a Kinetic Model", Applied Catalysis A: General vol. 248, pp. 279-289, (2003).
Dunn et al., "Effects of Minor Constituents on Cold Flow Properties and Performance of Biodiesel", Progress in Energy and Combustion Science, vol. 35, No. 6, p. 481-489, Dec. 1, 2009.
International Search Report Dated Apr. 7, 2011, Mailed Apr. 14, 2011.
Translation of International Search Report Dated Apr. 7, 2011, Mailed Apr. 14, 2011.

* cited by examiner

*Primary Examiner* — Deborah D Carr
(74) *Attorney, Agent, or Firm* — Norris McLaughlin & Marcus PA

(57) ABSTRACT

A method for reprocessing a phase substantially consisting of steryl glycoside/fatty acid alkyl ester/water agglomerates, which was formed when fatty acid alkyl ester generated by transesterification of vegetable oils or animal fats was washed with water, wherein the water content is evaporated by heating the phase and subsequently the steryl glycosides are split into their sterol and sugar fractions in the presence of an acid catalyst.

15 Claims, No Drawings

METHOD FOR REPROCESSING BIODIESEL SLUDGE

This is a 371 of PCT/DE2010/001302 filed 6 Nov. 2010 (international filing date).

The invention relates to a method for reprocessing a phase substantially consisting of steryl glycoside/fatty acid alkyl ester/water agglomerates, so-called biodiesel sludge, which was formed when fatty acid alkyl ester generated by transesterification of vegetable oils or animal fats was washed with water.

BACKGROUND OF THE INVENTION

For example from the specialist article "The Role of Sterol Glucosides on Filter Plugging", Inmok, Lee et al., Biodiesel Magazine, April 2007, it is known that in the transesterification of natural fats or oils with alkyl alcohol the steryl glycosides naturally present in the fats or oils largey lose their solubility both in oil or fat and in the fatty acid alkyl ester obtained by transesterification, so that they are precipitated as fine suspended particles and in use of the fatty acid alkyl ester as biodiesel lead to cloggings of the diesel filters and to deposits in the engine.

In natural fats and oils, the steryl glycosides largely are present in the so-called acylated form, i.e. a fatty acid residue is coupled to their sugar fraction via an ester bond, which provides for the dissolution in fat, oil and fatty acid alkyl ester. In the transesterification, in the presence of the alkyl alcohol and transesterification catalyst, however, the fatty acid residue is separated from the sterol glycoside molecule, so that the solubility gets lost and the above-mentioned disturbing precipitations are obtained.

To remove steryl glycosides from the fatty acid alkyl ester obtained by transesterification, the so-called crude biodiesel, several methods were proposed. As reported in WO 2009/132670, for example, a method exists in which the crude biodiesel is cooled and the precipitated particles then are filtered off. In its execution, however, this method is extremely expensive. WO 2009/132670 ifself proposes the use of an adsorbent consisting of a smectite/silica gel mixed phase.

In the above-mentioned specialist article by Lee, Inmok et al., a filtration of the biodiesel through diatomaceous earth is proposed.

WO 2009/106360 proposes to break down the steryl glycoside molecules into the sterol and the sugar fraction by means of an enzyme.

In this method it is disadvantageous that very special agents, the adsorbent, filter material or the enzyme must be purchased for carrying out the method, and that possibly, after carrying out the method, these auxiliary substances must be disposed of at high cost.

The German Patent Application 10 2008 050935.3-44, not disclosed yet, proposes to vary the acid wash of the crude fatty acid alkyl ester known from DE 10 2006 044 467 B4 such that it is able to also wash out steryl glycosides, beside the other impurities, from the fatty acid alkyl ester phase, the so-called crude biodiesel. During the wash, the steryl glycosides are dissolved out of the ester phase and form a new phase substantially consisting of steryl glycoside/fatty acid alkyl ester/water agglomerates. This process is explicable in that the steryl glycoside molecule consists of a hydrophilic part, the sugar part, and a hydrophobic part, the sterol part.

By intensive treatment of the agglomerate phase with mechanical stirrers its density is increased to such an extent that it is mechanically, e.g. by centrifugation, separable from the ester phase as so-called biodiesel sludge.

According to the prior art, no method exists for reprocessing this sludge, so that the same represents a considerable disposal problem and the valuable substances contained therein get lost.

Therefore, it has been the object to provide a simple method producing as little residues as possible for reprocessing a biodiesel sludge substantially consisting of steryl glycoside/fatty acid alkyl ester/water agglomerates.

SUMMARY OF THE INVENTION

This object substantially is solved by a method with the features of claim 1, in which in a first step the water is removed from the sludge by evaporation, whereby a crude biodiesel highly enriched with sterol glycosides is obtained, and subsequent breakdown of the steryl glycosides, in the presence of an acid catalyst, into their sterol and sugar fractions either by adding an anhydrous, strong acid which after completed breakdown of the steryl glycosides is neutralized by adding an equivalent amount of a base, or by contacting with an acidically acting solid ion exchanger.

In the specialist article "Lipid Components of Leaves", P. S. Sastry/M. Kates, LIPIDS, Vol. 3, No. 9, p. 1272, September 1964, the hydrolysis of lecithin in methanolic hydrochloric acid is described. This basic idea, the breakdown of a molecule initiated by hydrogen protons, was used for the development of the method according to the invention.

This step initially was precluded by the experience that the acid wash of the crude fatty acid alkyl ester, as it has long since been carried out according to DE 10 2006 044 467 B4 with 3% hydrochloric acid for removing impurities, such as soaps, and for neutralizing the basic transesterification catalyst, a breakdown of the steryl glycosides quite obviously is not effected. Even if most of the hydrochloric acid is neutralized by the basic transesterification catalyst, the washing water still is slightly acid.

Nevertheless, when using this acid wash, no breakdown of the steryl glycosides is observed, but, in particular when oils with a high steryl glycoside content are used for transesterification, the formation of a steryl glycoside/fatty acid alkyl ester/water agglomerate phase. This has led to the assumption that the strong hydrophilic effect of the sugar fraction of the steryl glycoside molecule leads to the formation of a protective layer of water molecules, which prevents the attack of the catalyst on the ester bond between sugar and sterol fraction, and hence the breakdown of the molecule. Own experiments have confirmed that the freedom from water of the crude fatty acid alkyl ester is the decisive prerequisite for the acid-catalyzed breakdown of the steryl glycoside molecules.

DETAILED DESCRIPTION

In a special aspect of the invention, the water is evaporated from the crude biodiesel at a temperature between 120 and 180° C., preferably between 140 and 160° C., wherein the evaporation should proceed under atmospheric pressure or at negative pressure, preferably between 500 and 800 mbar.

In a further special aspect of the invention, the breakdown of the steryl glycosides is effected by contacting the crude biodiesel with an acidically acting solid ion exchanger. A useful ion exchanger for example is a sulfonic-acid-based organic ion exchanger resin, but also an inorganic zeolite-based ion exchanger. These method steps particularly advantageously are carried out at an elevated temperature, most suitably at a temperature between 100 and 200° C. This variant of the method has the advantage that no acid is mixed into the crude biodiesel, which subsequently must be neutralized or removed again.

In a further special aspect of the invention, the breakdown of the steryl glycosides is effected by adding methanolic sulfuric acid to the crude biodiesel.

Advantageously, the acid quantity in the methanol amounts to between 4 and 50 wt-%, the acid (without methanol content) is added in a mass ratio to the steryl glycosides of 0.2 to 3 to 1, the addition of the acid and the breakdown of the sterol glycosides is effected at a temperature of 30 to 150° C., preferably at 40 to 80° C., and this is effected under such an excess pressure that the methanolic fraction of the acid substantially is not evaporated.

The product of the method according to the invention is a crude biodiesel with an increased content of dissolved sterols and sugars. Before using the biodiesel as fuel, the sugar content must be removed. This can be effected by washing the crude biodiesel with water, with the sugar fracton passing over into the washing water phase.

The increased sterol content, however, does not diminish the usability of the biodiesel. Optionally however, when it is economically expedient, the sterols can be isolated from the crude biodiesel, in order to be utilized as valuable material. Subsequent to the removal of the sugar fraction, the sterols therefore can be separated by stripping with steam.

Further developments, advantages and possible applications of the invention can also be taken from the following description of application examples. All features described form the subject-matter of the invention per se or in any combination, independent of their inclusion in the claims or their back-reference.

When carrying out the examples, the following measurement and analysis methods were employed:
  determination of phosphatides, DIN EN 14107
  determination of sulfur, DIN EN ISO 20884
  determination of fatty acid methyl ester, DIN EN 14103
  determination of steryl glycosides, sterols, DIN EN 14105
  determination of methanol, DIN EN 14110
  determination of sugar, by means of High Pressure Liquid Chromatography with refractive index detector
  determination of water, DIN EN ISO 12937
  determination of free fatty acids, DIN EN 14104
  determination of sulfuric acid, ion-chromatographic determination of sulfate ions or by precipitation as barium sulfate Example 1

In a pilot plant operating by the method patented in DE 10 2006 044 467 B4, crude biodiesel was generated from palm oil by basically catalyzed transesterification with methanol. The production capacity of the pilot plant was 100 kg crude biodiesel per 24 hours.

The palm oil used had the following composition:

| | |
|---|---:|
| Free fatty acid: | 0.02 wt-% |
| Moisture: | 0.02 wt-% |
| Phosphorus: | 6 ppm |
| Sulfur: | <1 ppm |
| Steryl glycosides: | 1015 ppm |

After the neutralization with 3% hydrochloric acid according to the invention, the crude fatty acid methyl ester had the following composition:

| | |
|---|---:|
| Free fatty acid: | 0.03 wt-% |
| Moisture: | 0.47 wt-% |
| Phosphorus: | 3 ppm |
| Sulfur: | <1 ppm |
| Steryl glycosides: | 970 ppm |

The crude fatty acid methyl ester was subjected to washing with water in a washing column in a continuous process, wherein in the washing column, at the boundary between water and ester phase, a phase substantially consisting of steryl glycoside/fatty acid alkyl ester/water agglomerates was formed, which was constantly loosened up by stirring, so that the agglomerates passed over into the ester phase and were suspended therein. The ester phase was continuously withdrawn from the washing column into a stirred tank and in the same treated with an intensive mixer by adding water. There was formed a mixture of crude biodiesel and biodiesel sludge which had been formed from the agglomerates by the intensive mixing. The mixture was continuously transferred from the intensive mixing tank into a centrifuge by means of which the sludge was separated from the crude biodiesel.

This washing process corresponded to the method described in the German Patent Application 10 2008 050935.3-44 not yet published.

From the wash of 100 kg crude biodiesel, which was carried out with water, a biodiesel sludge quantity of 8100 g was obtained. This sludge had the following composition:

| | |
|---|---:|
| Steryl glycosides: | 1.0 wt-% |
| Fatty acid methyl ester: | 49.0 wt-% |
| Water: | 50.0 wt-% |

After a residence time of 24 h, fatty acid methyl ester had settled down from the sludge layer as upper layer and water had settled down as lower layer. After separately sucking off the two layers, a sludge quantity of 7240 g was left with the following composition:

| | |
|---|---:|
| Steryl glycosides: | 1.1 wt-% |
| Fatty acid methyl ester: | 48.3 wt-% |
| Water: | 50.6 wt-% |

Under atmospheric pressure and by stirring, this sludge was heated to 150° C. and for another 3 h was stirred at 150° C., until the water from the solution had evaporated almost completely and a solution quantity of 3584 g was obtained with the following composition:

| | |
|---|---:|
| Steryl glycosides: | 2.2 wt-% |
| Fatty acid methyl ester: | 97.5 wt-% |
| Water: | 0.3 wt-% |

Under atmospheric pressure and by stirring, the solution was cooled to 50° C. and an amount of 200 g of a 30 wt-% methanolic sulfuric acid was added slowly. The solution was stirred for 2 h at 50° C.

There was obtained a solution quantity of 3776 g with the following composition:

| Sterols: | 1.5 wt-% |
|---|---|
| Fatty acid methyl ester: | 92.4 wt-% |
| Sugar: | 0.7 wt-% |
| Water: | 0.1 wt-% |
| Sulfuric acid: | 1.6 wt-% |
| Methanol: | 3.7 wt-% |
| Steryl glycosides: | could not be detected |

Subsequently, the solution was treated four times each with 150 g of 40% sodium hydroxide solution and with 3 liters of water of 50° C. in a stirred tank with an intensive mixer, wherein the sugar and the methanol content passed over into the water phase. Subsequently, the water was separated by decanting. After the fourth pass, the quantity of the fatty acid methyl ester phase was 3564 g and had the following composition:

| Sterols: | 1.6 wt-% |
|---|---|
| Fatty acid methyl ester: | 97.9 wt-% |
| Water: | 0.5 wt-% |
| Acid concentration: | <0.1 wt-% |

Example 2

From the wash carried out with water of 100 kg crude biodiesel of the same specification as in Example 1, a biodiesel sludge quantity of 8000 g was obtained after the washing method described in Example 1. This sludge had the following composition:

| Steryl glycosides: | 1.1 wt-% |
|---|---|
| Fatty acid methyl ester: | 47.7 wt-% |
| Water: | 51.2 wt-% |

After a residence time of 24 h, fatty acid methyl ester had settled down from the sludge layer as upper layer and water had settled down as lower layer. After separately sucking off the two layers, a sludge quantity of 7097 g was left with the following composition:

| Steryl glycosides: | 1.2 wt-% |
|---|---|
| Fatty acid methyl ester: | 48.4 wt-% |
| Water: | 50.4 wt-% |

Under atmospheric pressure and by stirring, this sludge was heated to 150° C. and for another 3 h was stirred at 150° C., until the water from the solution had evaporated almost completely and a solution quantity of 3530 g was obtained with the following composition:

| Steryl glycosides: | 2.4 wt-% |
|---|---|
| Fatty acid methyl ester: | 97.3 wt-% |
| Water: | 0.3 wt-% |

This crude fatty acid methyl ester phase was cooled to 140° C. and continuously passed through a treatment column with solid ion exchanger.

For the test set-up a double-jacket steel cylinder with a length of about 80 cm and an inside diameter of 5 cm was used, which was filled with glass beads with 3 mm diameter, glass wool and 200 g of the highly acid ion exchanger R CT269DR (Purolite). The ion exchanger bed length was 300 mm; the granule diameter of the ion exchanger was 0.7-0.8 mm.

From a heated recipient vessel, the ester was conveyed into the column from below by means of a pump and via the upper column outlet discharged into a collecting tank. Heating of the column jacket was effected via a thermostatted oil bath circuit. The throughput was 200 ml/h. After about 12 h, the process was stopped.

There was obtained a solution quantity of 1914 q with the following composition:

| Sterols: | 1.7 wt-% |
|---|---|
| Fatty acid methyl ester: | 96.9 wt-% |
| Sugar: | 0.7 wt-% |
| Water: | 0.1 wt-% |
| Free fatty acid: | 0.7 wt-% |
| Steryl glycosides: | could not be detected |

The invention claimed is:

1. A method for reprocessing a phase substantially consisting of steryl glycoside/fatty acid alkyl ester/water agglomerates, which was formed when fatty acid alkyl ester generated by transesterification of vegetable oils or animal fats was washed with water, comprising the sequence of the following method steps:
   a) evaporation of the water content;
   b) breakdown of the steryl glycosides into their sterol and sugar fractions in the presence of an acid catalyst either by addition of an anhydrous strong acid or by contacting with an acidically acting solid ion exchanger.

2. The method according to claim 1, wherein, subsequent to method step 1. b), when using liquid or dissolved acids, a neutralization of the acid added in the preceding step is effected by adding an equivalent amount of a base.

3. The method according to claim 1, wherein evaporating the water is effected at a temperature of 120 to 180° C., and at atmospheric pressure, or at negative pressure.

4. The method according to claim 1, wherein said contacting of step b) is effected with an acidically acting solid ion exchanger at a temperature of 100 to 200° C.

5. The method according to claim 1, wherein an anhydrous liquid acid is added to the mixture as catalyst for the breakdown of the sterol glycosides.

6. The method according to claim 5, wherein the acid quantity in the methanol is 4 and 50 wt-%, the acid (without methanol content) is added in a mass ratio to the steryl glycosides of 0.2 to 3 to 1, the addition of the acid and the breakdown of the sterol glycosides is effected at a temperature of 30 to 150° C. and this is effected under such an excess pressure that the methanolic fraction of the acid substantially is not evaporated.

7. The method according to claim 1, wherein a sulfonic-acid-based organic ion exchanger resin or a zeolite-based inorganic ion exchanger is used as ion exchanger.

8. The method of claim 3, wherein said temperature is 140 to 160° C.

9. The method of claim 3, wherein said negative pressure is 500 to 800 mbar.

10. The method according to claim 2, wherein an anhydrous liquid acid is added to the mixture as catalyst for the breakdown of the sterol glycosides.

11. The method of claim 5 wherein said anhydrous liquid acid is methanolic acid.

12. The method of claim 10 wherein said anhydrous liquid acid is methanolic acid.

13. The method of claim 11 wherein said methanolic acid is methanolic sulfuric acid.

14. The method of claim 12 wherein said methanolic acid is methanolic sulfuric acid.

15. The method according to claim 10, wherein the acid quantity in the methanol is 4 and 50 wt-%, the acid (without methanol content) is added in a mass ratio to the steryl glycosides of 0.2 to 3 to 1, the addition of the acid and the breakdown of the sterol glycosides is effected at a temperature of 30 to 150° C. and this is effected under such an excess pressure that the methanolic fraction of the acid substantially is not evaporated.

* * * * *